United States Patent [19]

Astill et al.

[11] 4,245,532

[45] Jan. 20, 1981

[54] SHEAR MACHINE WITH REPLACEABLE SHEAR ASSEMBLY

[75] Inventors: Michael Astill, Lower Whitley Village; Alec Sunderland, Weymouth; Maurice G. Waine, Sale, all of England

[73] Assignee: British Nuclear Fuels Limited, Risley, England

[21] Appl. No.: 952,294

[22] Filed: Oct. 18, 1978

[30] Foreign Application Priority Data

Oct. 20, 1977 [FR] France .................. 77 31625

[51] Int. Cl.$^3$ .................. B23D 33/08; B23D 35/00
[52] U.S. Cl. .................. 83/390; 83/282; 83/378; 83/379; 83/563; 83/925 R
[58] Field of Search .................. 83/390, 378, 379, 278, 83/925 R, 282, 563; 252/301.1 W

[56] References Cited

U.S. PATENT DOCUMENTS

| | | | |
|---|---|---|---|
| 3,077,134 | 2/1963 | Ronick | 83/563 X |
| 3,460,423 | 8/1969 | Hayashi | 83/563 X |
| 3,559,522 | 2/1971 | Valente | 83/698 X |
| 3,610,083 | 10/1971 | Yasuda et al. | 83/563 X |
| 3,621,742 | 11/1971 | Kendall | 83/923 R |
| 3,638,523 | 2/1972 | Yasuda et al. | 83/698 X |
| 3,672,247 | 6/1972 | Cherel | 83/925 R |
| 3,722,338 | 3/1973 | Cherel | 83/925 R |
| 4,091,699 | 5/1978 | Chazé | 83/277 X |

*Primary Examiner*—J. M. Meister
*Attorney, Agent, or Firm*—Larson, Taylor and Hinds

[57] ABSTRACT

A shear machine for irradiated nuclear fuel elements has a replaceable shear assembly comprising a fuel element support block, a shear blade support and two clamp members which hold the fuel element to be sheared in contact with the support block. A first clamp member contacts the fuel element remote from the shear blade and a second clamp member contacts the fuel element adjacent the shear blade and is advanced towards the support block during shearing to compensate for any compression of the fuel element caused by the shear blade.

1 Claim, 6 Drawing Figures

SHEAR MACHINE WITH REPLACEABLE SHEAR ASSEMBLY

BACKGROUND TO THE INVENTION

This invention relates to shear machines and particularly to shear machines for use in the reprocessing of irradiated nuclear fuel elements.

After irradiation in a nuclear reactor irradiated nuclear fuel material may be processed to separate the fission products from re-usable nuclear fuel material. The separation of the re-usable nuclear fuel is usually a solvent extraction process and before such a process can be used the irradiated nuclear fuel material has to be dissolved in a suitable liquid medium which is usually nitric acid.

Nuclear fuel material for use in a nuclear reactor is contained in fuel pins. For ease of handling several fuel pins are combined together in a fuel element. The pins are held in a spaced apart relationship by grids and the fuel element has an outer tubular cover or wrapper. A method of separating the nuclear fuel material from the material which forms the fuel pins, grids and wrapper is required so that the amount of radioactive liquid to be treated in the reprocessing plant is as low as possible. One method of doing this is to preferentially dissolve the nuclear fuel material in the liquid medium leaving the material of the fuel pins, grids and wrapper to be disposed of as solid radioactive waste. Before the liquid medium can contact the nuclear fuel material the fuel pins have to be opened. This can be done by the use of a shear which shears the fuel pins into short lengths and thus allows the liquid medium to reach the fuel material.

Irradiated nuclear fuel elements are highly radioactive and the maintenance of a shear used to shear irradiated fuel has to be performed remotely. Maintenance is therefore difficult and time consuming resulting in long periods of time when the shear machine cannot be used.

Different reactor types use different types of fuel element and the requirements of a shear to shear each type of fuel element are also different. Therefore it is desirable to be able to change the shearing blade and the block on which the fuel element to be sheared is supported to suit each type of fuel element. Changing blades, like maintenance, is a difficult and time consuming operation because of the necessity to work remotely.

SUMMARY OF THE INVENTION

The invention provides a shear machine for irradiated nuclear fuel elements in which a reciprocating shear blade is driven by a driving ram to shear fuel elements supported on a fuel element support block by clamp members which are moved towards the support block by actuating rams to hold the fuel element to be sheared in contact with the support block, the shear machine having a removable shear assembly which comprises the fuel element support block, a support for the shear blade and two clamp members, the first of which is moved towards the support block by a first actuating ram to hold the fuel element to be sheared in contact with the support block at a position remote from the shear blade and the second of which is positioned adjacent the shear blade and is advanced towards the support block by a second actuating ram during shearing to compensate for any compression of the fuel element caused by the shear blade, said shear blade support being releasably engagable with the driving ram and said first and second clamping members being releasably engagable with the first and second actuating rams so that the shear assembly is readily removable from the shear assembly. Conveniently the clamp actuating rams may be co-axial, the ram for the second clamp member being within the ram for the first clamp member and the clamp actuating rams are releasably engaged with the clamp members by means of bayonet couplings.

The ram for driving the shear blade support may be hydraulically operated. The driving ram may have an aperture adjacent its outer end which receives a hook-shaped projection on the shear blade support to releasably engage the ram and support.

The shear machine may additionally make provision for advancing the fuel element to be sheared towards the shear blade by a predetermined distance between each shearing stroke of the shear blade.

The shear machine may also include locating means whereby the shear assembly is positioned and held in the correct position within the shear machine.

The use of a removable shear assembly minimises the time when the shear cannot be used because of maintenance or the necessity to alter the shear to be suitable for a different type of fuel element. When a shear assembly requires maintenance it can be readily removed from the shear machine and transported to an area remote from the machine for the maintenance to be performed. A replacement shear assembly may be used in the shear machine whilst the first is being maintained. If a different type of fuel is to be sheared the shear assembly is readily removed and stored and another shear assembly adapted for the different fuel element is used in the shear machine.

DESCRIPTION OF THE DRAWINGS

The invention will be illustrated by the following description, given by way of example only of a shearing machine for irradiated nuclear fuel elements: the description has reference to the accompanying drawings wherein.

DESCRIPTION OF THE PREFERRED EMBODIMENT

Figure 1:
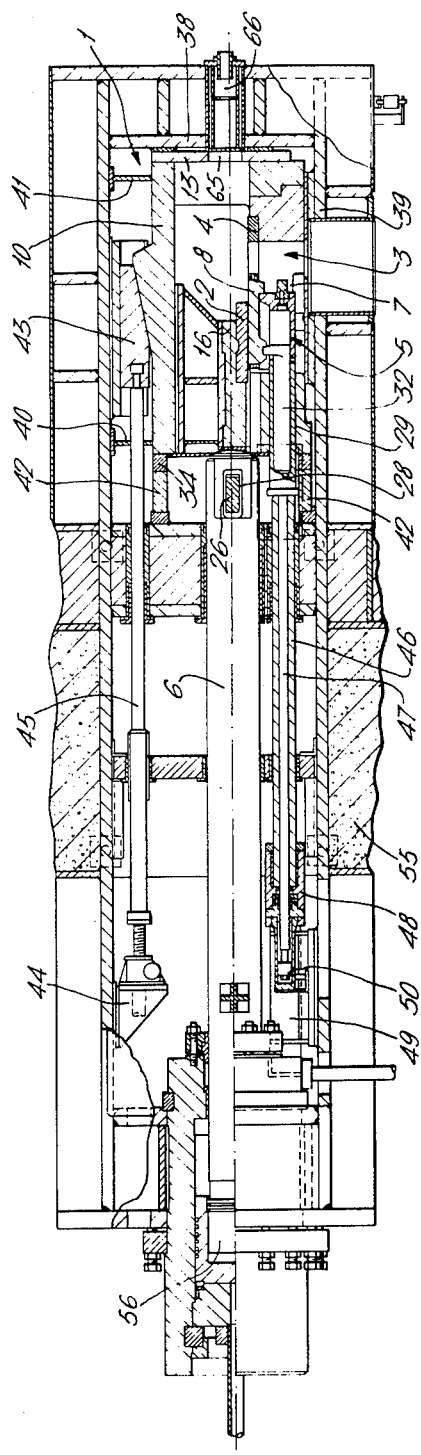
FIG. 1 is a cross-sectional view of the shear machine incorporating a replaceable shear assembly.

The shear machine illustrated in FIG. 1 comprises a replaceable shear assembly 1 having within it a movable blade 2 which shears irradiated fuel element (not shown) which protrude through an aperture 3 in one side of the shear assembly 1. The fuel assembly is held against a block 4 by a clamp assembly (shown generally by the reference numeral 5 and described in more detail hereinafter). The shear blade 2 is moved by a hydraulic driving ram 6 and the clamp assembly 5 which has outer and inner clamp member 7, 8 is operated by smaller hydraulic rams to be described hereinafter.

Figure 2:
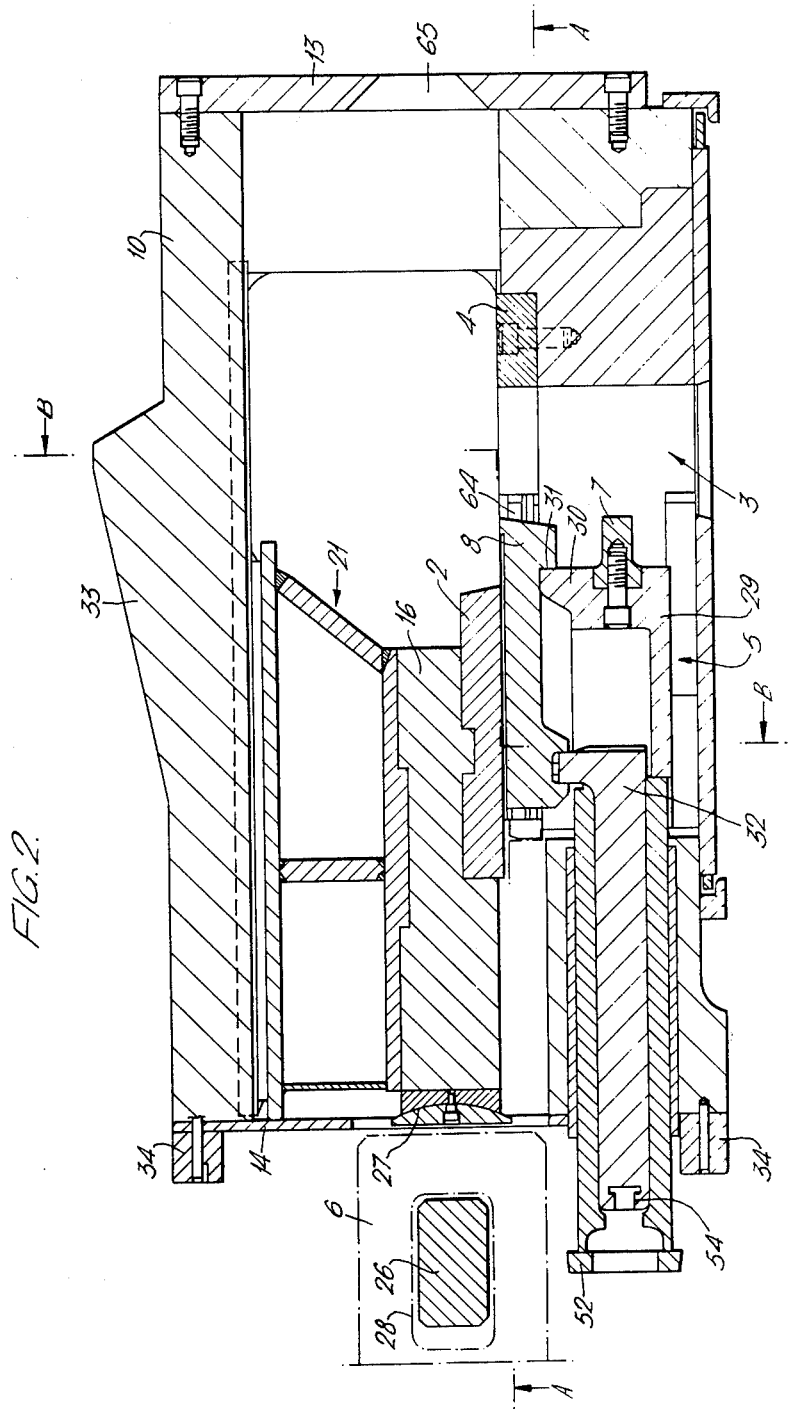
FIG. 2 is an enlarged cross-sectional view of the replaceable shear assembly of FIG. 1.
Figure 3:
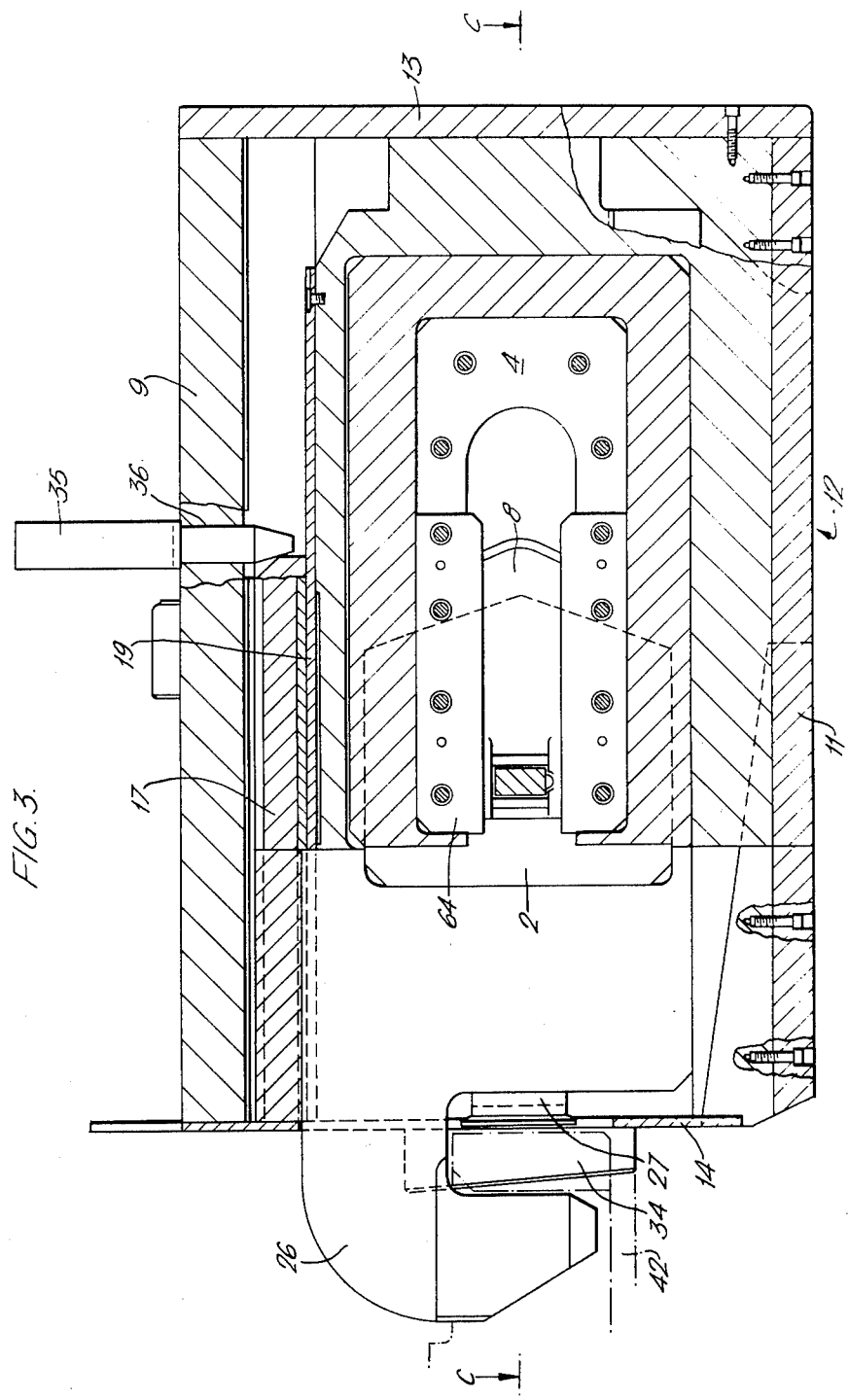
FIG. 3 is a cross-sectional view taken along the line A—A of FIG. 2 showing the line C—C along which the cross-sectional view of FIG. 2 is taken.
Figure 4:
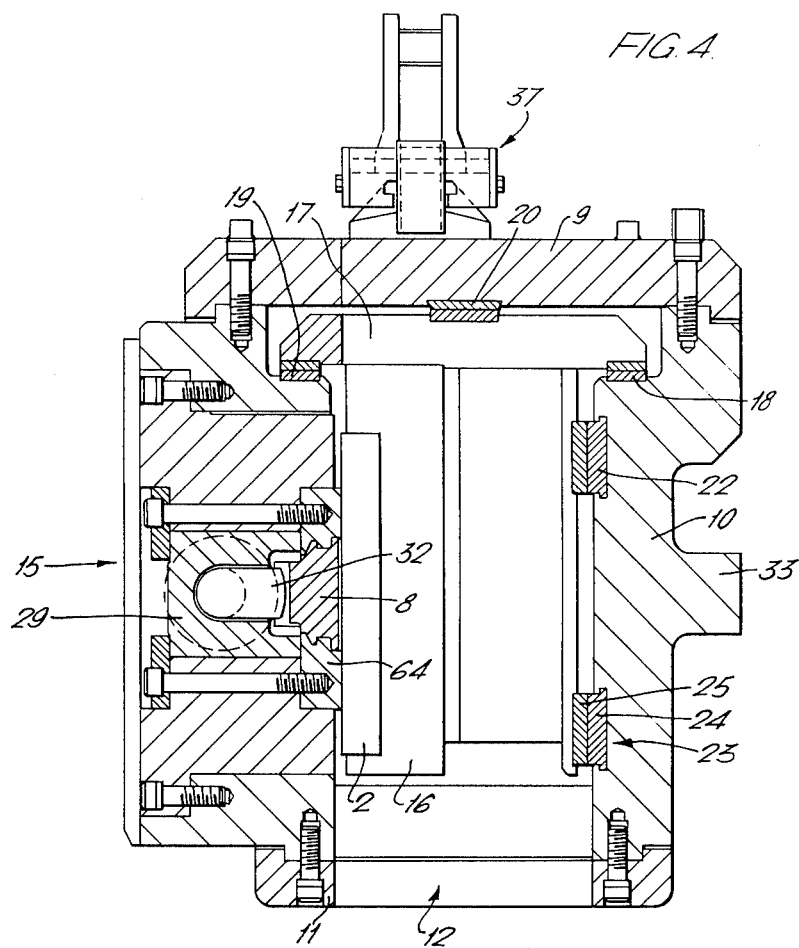
FIG. 4 is a cross-sectional view taken along the line B—B of FIG. 2.

The shear assembly 1 comprises a casing having an upper wall 9 (FIG. 4) a side wall 10, a lower wall 11 having an aperture 12 through which the sheared fuel element fragments fall into the dissolver, and end walls 13, 14 (FIGS. 2 and 3). The remaining side of the casing is closed by a member 15 which carries the clamp assembly 5 and anvil 4. The movable blade 2 is supported on a blade-supporting block 16 which is attached to a cross-member 17 (FIG. 4) which slides on linear bearings 18, 19 located at the upper ends of the side wall 10 and member 15 respectively. A further linear bearing 20 on the underside of the upper wall 9 urges the surfaces of the bearings 18, 19 into contact. A guiding frame 21 extends from the face of the block 16 remote from the blade 2 and runs on guide bearings 22, 23 on the inside of the side wall 10. The position of the guide bearings 22, 23 is adjustable so that the clearance between the blade 2 and the anvil 4 can be controlled. The bearings 18, 19, 21, 22, 23 are dry bearings and each consists of steel strip 24 on the casing of the shear assembly and a composite bearing material 25 sold under the trade name Glacier DU on the moving parts. The composite bearing material comprises a steel backing having bonded thereto a sintered bronze layer in which polytetrafluorethylene (ptfe) fills in the interstices of the sintered bronze and a surface coating of ptfe overlying the sintered bronze layer. The block 16 extends through an aperture in the end wall 14 and is formed with a hook shaped projection 26 which fits into an aperture 28 adjacent the end of the driving ram 6. The block 16 also has a thrust surface 27 which abuts the end of the driving ram 6 in use.

Figure 5:
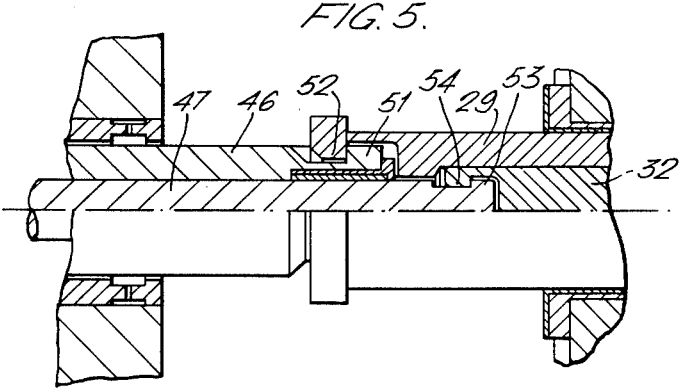
FIG. 5 is an enlarged part-sectional view of the connector shown within the chain dotted square of FIG. 1.

The clamp assembly 5 will now be described. The outer clamp member 7 is attached to the end of a hollow push rod 29. As the push rod 29 moves in the direction of the anvil 4 (to the right as shown in FIG. 2) the outer clamp member 7 forces the fuel element to be sheared into contact with the anvil 4. A projection 30 on the push rod 29 contacts a surface 31 on the inner clamp member 8 and moves the inner clamp member 8 towards the anvil 4 as the outer clamp member 7 moves. The inner clamp member 8 is also movable in slides 64 by means of a push rod 32 which moves within the bore of the hollow push rod 29. The push rods 29, 32 are provided with bayonet joints at their outer ends so that hydraulic rams may be connected thereto when the shear assembly is fitted into the shear machine. These bayonet joints are described hereinafter with reference to FIG. 5.

The side wall 10 of the shear assembly has a wedge shaped projection 33 and the end wall 14 has sloping projections 34 which serve to locate the shear assembly in the correct position in the shear machine. The fitting of a shear assembly to the shear machine will now be described.

Before the shear assembly is moved a pin 35 is inserted through an aperture 36 in the upper wall 9 of the frame. That portion of the pin extending inside the frame contacts the cross member 17 as shown in FIG. 3 and locks the blade supporting assembly in its fully retracted position. It is preferred that the inner and outer clamp members are adjacent the block 4 (that is as far to the right as possible in FIG. 2). The shear assembly is then lifted by crane which is connected to the assembly by means of an attachment 37 on the upper wall 9. The shear assembly is then lowered into the shear machine and is guided into place by guide frames (not shown) located above the locating walls 38, 39 of shear machine and by guide plates 40, 41 which contact the outside of the side wall 10 of the shear assembly. As the shear assembly is lowered the hook-shaped projection 26 engages with the aperture 28 in the driving ram 6 and the sloping projections 34 on the end wall 14 contact sloping ramps 42 fixed to the shear machine. The ineraction of the projections 34 and the ramps 42 causes the shear assembly to be urged towards the locating wall 38. A wedge 43 driven by a screw jack 44 which drives a shaft 45 is then advanced to contact the wedge shaped projection 33. As the wedge 43 advances the shear assembly is urged towards the locating walls 38, 39 and is firmly held with the end wall 13 abutting the locating wall 38 and the member 15 abutting the locating wall 39. An aperture 65 in the end wall 13 is aligned with an observation port 66 in the locating wall 38 so that the interior of the shear can be observed.

The push rods 29, 32 of the clamp assembly 5 are connected to coaxial outer and inner operating rams 46, 47 when the shear assembly has been placed in the shear machine. The outer operating ram 46 is fitted to a cross-head 48 in such a way that it can rotate. The cross-head 48 is moved by twin hydraulic cylinders above and below the axis of the operating rams. The lower hydraulic cylinder is shown at 49 in FIG. 1. A hydraulic cylinder 50 for the inner operating ram 47 is fixed onto the cross-head 48. The inner operating ram 47 lies within the outer operating ram 46 and is free to slide within it but is keyed to the outer ram so that the inner ram is not able to rotate within the outer ram. The cross-head 48 is provided with means (not shown) for rotating the rams together through 90°. The end of the outer ram 46 has two diametrically opposed outwardly-directed flanges 51 (FIG. 5) each of which occupies an arc of slightly less than 90°. The end of the push rod 29 has two diametrically opposed inwardly directed flanges 52. To connect the ram 46 to the push rod 29 the outwardly directed flanges 51 on the ram 46 are advanced between and beyond the flanges 52 on the push rod 29 and then relative rotation of 90° between the ram 46 and the push rod 29 causes the flanges to engage in the manner of a bayonet fitting. The inner ram 47 and inner push rod 32 have similar flanges 53, 54 respectively. After the shear assembly has been placed in position the twin hydraulic cylinders are used to move the rams 46, 47 together towards the push rods 29, 32. When the ends of the rams are positioned within the ends of the push rods the rotating means on the cross head 48 is operated to cause the bayonet fittings to couple the rams and push rods.

After the shear assembly has been fitted the pin 35 must be removed to allow the blade 2 to move.

The shear machine extends through concrete shielding with the shear assembly inside a shearing cave but with the hydraulic cylinders 49, 50 for operating the rams 46, 47, the screw jack 44 for moving the shaft 45 and the hydraulic cylinder 56 for operating the driving ram 6 which drives the blade 2 outside the cave on the opposite side of the shielding. The rams 46, 47, 6 and the shaft 45 penetrate the shielding. Because the hydraulic cylinders and screw jack are separated from the highly radioactive shearing cave by the shielding, maintenance of these parts of the shear machine is simplified.

Figure 6:
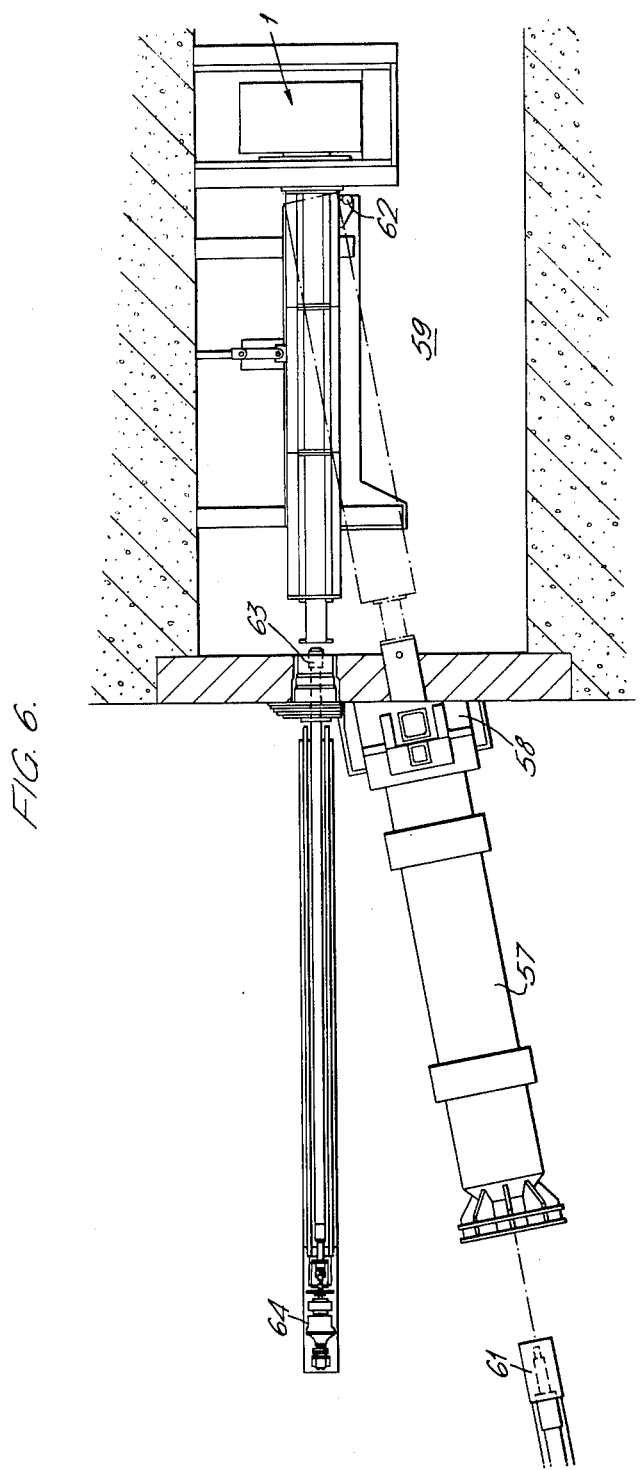
FIG. 6 is a plan view of the means by which a fuel element to be sheared is fed to the shear machine.

The operation of the shear machine to shear irradiated nuclear fuel elements will now be described with reference to FIG. 6. Irradiated nuclear fuel elements are stored under water in storage ponds and the irradiated nuclear fuel element to be sheared is transported to the building housing the shear machines in a transport flask 57. The transport flask 57 is locked onto a port 58 leading into the shearing cave 59. The fuel element to be sheared is pushed from the flask 57 into an envelope 60 within the cave 59 by a ram 61. The envelope 60 is pivotted around a point 62. The position of the envelope 60 when it is receiving a fuel element from the flask 57 is shown dotted in FIG. 6. The envelope 60 is then moved to the position shown by full lines. A feed ram 63 driven by a motor 64 is used to push the fuel element along the envelope towards the shear assembly 1. The feed ram is programmed so that the fuel element is advanced the required distance between each cutting stroke of the shear blade 2. At each end of a typical fuel element are portions which contain no nuclear fuel material and it is undesirable to shear these portions into the small pieces which are necessary for those portions of the fuel elements which contain nuclear fuel material. The feed ram 63 moves the fuel element through the aperture 3 in the shear assembly 1 so that the leading end portion is removed and when those portions of the fuel element which contain the nuclear fuel material enter the shear assembly the feed ram is programmed to move the element forward by 1-2 inches between each shearing stroke. After shearing the fuel element fragments fall into perforated baskets in the dissolver where nitric acid is used to preferentially dissolve the nuclear fuel material.

When a fuel element is in the aperture 3 the twin hydraulic cylinders 49 moves the operating rams 46, 47 forward together so that the inner and outer clamp members 7, 8 urge the fuel element into contact with the block 4. The driving ram 6 then operates to move the blade 2 to shear off the part of the fuel element protruding past the block 4. As the shear blade 2 shears the fuel element the fuel element is compressed and the inner clamp member 8 is moved forward by the hydraulic cylinder 50 during the shearing operation to ensure that the compressed portion of the fuel element remains in contact with the block 4. After the fuel element has been sheared the blade 2 is retracted and the clamp members 7, 8 withdrawn to allow the feed ram 63 to move the fuel element forward for the next shearing cycle.

When the shear assembly 1 requires maintenance or replacement it can be readily removed from the shear machine. The outer and inner operating rams 46, 47 are rotated through 90° to disengage the flanges 51, 52 and 53, 54 on the bayonet fittings connecting the rams with push rods 29, 32 of the clamping members 7, 8 and the rams are withdrawn. The screw jack 44 is operated to retract the wedge 43. The shear assembly may then be lifted from the shear machine. A replacement shear assembly may then be fitted which is used whilst the removed assembly is being maintained or another shear assembly adapted for a different type of fuel may be fitted. Before the shear assembly is removed from the shear machine sprays (not shown) are directed at the assembly to remove as many as possible of the radioactive particles which adhere to the assembly in use. If the removed assembly requires maintenance further decontamination may be required before the maintenance can be performed. As this maintenance is performed away from the shear machine the machine can be used with the replacement assembly whilst the removed assembly receives attention. This facility minimises the time during which the shear machine cannot be used.

In a shear machine the parts which wear most rapidly are the shear blade and the block. By having these in a removable assembly the shear machine of the present invention simplifies their replacement. The other moving parts within the highly radioactive shearing cave constitute the clamping assembly and if they require attention the shear assembly can be readily removed.

Many different reactor types are in use throughout the world utilising several different types of fuel element. If a reprocessing plant is to be capable of handling fuel elements from several different nuclear power stations it must be readily adaptable for the different types of fuel element. By the use of a readily removable shear assembly, the present invention provides a shear machine which can be rapidly converted for use with a different type of fuel element.

By the use of a large hydraulic driving ram to drive the shear blade a shear machine can be used to shear fuel elements as they are received from nuclear power stations without any prior manipulation to break down the fuel elements. An exception to this are the fuel elements used in one kind of gas cooled reactor and which include graphite sleeves and cellular grids which must be removed before shearing the fuel pins. For most thermal reactor fuel elements having metal wrappers and grids the use of a 350 ton driving ram obviates the necessity for any pre-treatment before shearing.

We claim:

1. A shear machine for irradiated nuclear fuel elements and of the kind comprising, a frame, a reciprocating shear blade carried in the frame, a support block for the fuel element, the support block being complementary to the shear blade for shearing the fuel element, a ram for driving the shear blade, a pair of side-by-side clamp members movable towards and away from the support block to hold the fuel element in a shearable position against the support block, a pair of co-axial rams each for actuating one of the clamp members, a readily replaceable shear assembly unit housing said shear blade, said support block and said clamp members, means, comprising an aperture in the driving ram and a hook shaped projection on the shear blade which is received in the aperture in the driving ram, for releasably connecting the blade and ram such that the connection between the ram and blade is releasable by relative lateral motion, and means, comprising radial projections on each clamp member and the actuating ram therefor which are reversably interengageable by a combination of relative linear and rotational motions in the manner of bayonet couplings, for releasably connecting each said clamp member and the actuating ram therefor.

* * * * *